United States Patent [19]

Kawasaki et al.

[11] 3,922,154
[45] Nov. 25, 1975

[54] METHOD FOR PURIFICATION OF SODIUM HYDROXIDE

[75] Inventors: Shigetake Kawasaki, Isehara; Masaru Owa, Hino; Ichiro Hayano, Ashigara-kamigun; Takaji Akiya, Yokohama; Norio Takeuchi, Isehara; Totaro Goto, Kokubunji; Seiichi Ishizaka, Tokyo, all of Japan

[73] Assignee: Agency of Industrial Science & Technology, Tokyo, Japan

[22] Filed: Sept. 7, 1973

[21] Appl. No.: 395,072

[30] Foreign Application Priority Data
Sept. 11, 1972   Japan.................... 47-90314

[52] U.S. Cl. ................ 62/58; 23/302; 159/DIG. 5; 159/DIG. 17 B; 423/192
[51] Int. Cl.².... C01D 1/30; B01D 9/04; C01D 1/32
[58] Field of Search.................. 423/179, 184, 192; 159/DIG. 17, 24 A, DIG. 5; 62/58; 23/302

[56] References Cited
UNITED STATES PATENTS

| | | | |
|---|---|---|---|
| 3,119,772 | 1/1964 | Hess et al. .................... | 432/192 |
| 3,248,890 | 5/1966 | Oman .......................... | 62/58 |
| 3,259,181 | 7/1966 | Ashley et al. .................. | 62/58 X |
| 3,304,734 | 2/1967 | Dunn ........................... | 62/58 X |
| 3,561,225 | 2/1971 | Hinton ......................... | 62/58 |
| 3,813,892 | 6/1974 | Johnson ........................ | 62/58 |

*Primary Examiner*—Jack Sofer
*Attorney, Agent, or Firm*—Kurt Kelman

[57] ABSTRACT

A method for purification of sodium hydroxide, wherein a crude caustic alkali concentrate obtained by the electrolysis of a sodium chloride-containing solution is brought into direct contact with a refrigerant incapable of dissolving said concentrate so as to cool the concentrate and consequently precipitate sodium hydroxide crystals and the precipitated sodium hydroxide crystals are separated and then melted by utilizing the heat of liquefaction of said refrigerant to produce highly purified melted sodium hydroxide.

9 Claims, 3 Drawing Figures

3,922,154

METHOD FOR PURIFICATION OF SODIUM HYDROXIDE

BACKGROUND OF THE INVENTION

This invention relates to a method for the purification of sodium hydroxide, more particularly to a method for the manufacture of a highly purified sodium hydroxide containing little sodium chloride or highly purified sodium hydroxide in conjunction with a solution containing potassium hydroxide at a high concentration from a sodium chloride-containing crude aqueous solution of caustic alkali or from an aqueous solution of potassium hydroxide and sodium hydroxide.

It is universally known that sodium hydroxide is manufactured by the electrolysis of brine. Two methods are used for the purpose of this electrolysis: They are the Mercury Method which uses mercury as the cathode and the Diaphragm Method which separates anode chambers and cathode chambers by insertion of diaphragms. The Mercury Method permits easy production of highly purified sodium hydroxide at high concentrations. Because public concern about environmental pollution by mercury has sharply mounted in recent years, however, it has become inevitable for manufactures to rely upon the Diaphragm Method for the production of highly purified sodium hydroxide as it has no possibility of producing such environmental pollution.

The electrolyzate obtained by the Diaphragm Method usually contains 12 to 20 percent of sodium hydroxide and 12 to 14 percent of sodium chloride. In deriving sodium hydroxide from this electrolyzate, the electrolyzate is concentrated to a solid concentration of about 50 percent and cooled to have sodium chloride separated. Even after the removal of such separated sodium chloride, 1.2 to 1.4 percent by weight of sodium chloride remains yet to be eliminated.

In recent years, research has been pursued on the production of fresh water from sea water. Upon separation of fresh water there is formed a brine having its salt concentration increased to about two times. Studies are also being made in search for a method for obtaining sodium hydroxide by further concentrating the concentrated sea water and electrolyzate the resultant concentrate. As is widely known, sea water contains various inorganic substances dissolved therein. Those substances which are harmful to the electrolysis and those which degrade the quality of sodium hydroxide must be removed in advance from the sea water. While calcium, magnesium, etc. are easily removable, potassium existing in the form of monovalent ions resists removal and makes difficult the production of highly purified sodium hydroxide.

Heretofore, many methods have been suggested for precipitating and separating coarse sodium hydroxide from a crude caustic alkali concentrate by cooling the concentrate (as disclosed in U.S. Pat. No. 2,178,694, for example). According to these known methods, the caustic alkali concentrate is invariably cooled by an indirect means.

A primary object of this invention is to provide a method for continuously and easily obtaining highly purified sodium hydroxide from the electrolyzate occurring in the aforesaid Diaphragm Method or from the electrolyzate of the potassium-containing concentrated sea water remaining after removal of fresh water and, in case where the electrolyzate contains potassium, simultaneously separating a highly concentrated potassium-containing aqueous solution.

SUMMARY OF THE INVENTION

To accomplish the object mentioned above, the method according to this invention effects the purification of sodium hydroxide by first causing the electrolyzate produced in the Diaphragm Method or from the electrolyzate of concentrated sea water to be brought into direct contact with a refrigerant which is unreactive with and chemically stable against said aqueous solution of alkali, so as to induce precipitation of sodium hydroxide crystals in the aqueous solution. Since the sodium hydroxide crystals thus precipitated do not contain impurities, they are separated and, as occasion demands, melted by utilizing the heat of liquefaction of the refrigerant to afford a highly purified, melted sodium hydroxide. If the aqueous solution of caustic alkali given as the raw material also contains potassium, then the mother liquid remaining after the separation of sodium hydroxide is again brought into direct contact with said refrigerant to induce crystallization of unaltered sodium hydroxide and sodium chloride. A highly concentrated aqueous solution of potassium hydroxide is obtained by separating the educed crystals. The direct contact established between the crude aqueous solution of caustic alkali and the refrigerant has an excellent effect of greatly improving the transfer of heat and enabling the operation to be performed continuously.

Other objects and other characteristics of the present invention will become apparent from the further description of this invention given herein below with reference to the accompanying drawing.

DETAILED DESCRIPTION OF THE INVENTION

When the crude aqueous solution of caustic alkali obtained by hydrolyzing a sodium chloride-containing solution is concentrated to about 50 percent of solid content and then cooled, the greater part of the sodium chloride is educed as crystals. Nevertheless, the aqueous solution of sodium hydroxide remaining after separation of sodium chloride crystals still contains a small amount of sodium chloride. This aqueous solution of sodium hydroxide gives rise to crystallization of a hydrate in the form of 3.5-hydrate of sodium hydroxide when the solution is diluted to about 40 percent and brought to a temperature below 14°C. This crystalline hydrate is free from impurities. Sodium hydroxide of high purity, therefore, can be obtained from the solution containing the hydrate when the crystals are isolated by the solid-liquid separation technique.

Generally, two methods are adopted for the crystallization of a solute in an aqueous solution by the cooling of the aqueous solution: They are the indirect cooling method utilizing a heat exchanger and the direct cooling method whereby the aqueous solution is heated under reduced pressure to vaporize the water serving as the solvent and the solution is then brought into direct contact with a refrigerant to effect both concentration and cooling at the same time.

The temperature at which the 3.5-hydrate of sodium hydroxide is crystallized out of a caustic alkali solution having a concentration of about 40 percent does not exceed 14°C. At this time, the solution has a high degree of viscosity approximating 100 cps and a low vapor pressure of about 2 mmHg. With the solution under such conditions, it is technically impossible to adopt the direct cooling method mentioned above. When crystallization of the sodium hydroxide hydrate is carried out by the indirect method, however, crystals of the hydrate are deposited on the heat-transfer surface of the heat exchanger to impede the transfer of heat seriously, making it difficult to effect the operation of crystallization continuously.

In view of the actual state of affairs described above, the inventors pursued studies on crystallization of sodium hydroxide hydrate. Consequently, they have discovered that crystals of sodium hydroxide hydrate can easily and continuously be educed from the aqueous solution of caustic alkali when the required cooling of the solution is effected by bringing the solution into direct contact with a refrigerant which is not dissolved by the aqueous solution. The present invention has been accomplished on the basis of this discovery.

First, the method for producing highly purified sodium hydroxide from the electrolyzate obtained by electrolyzing brine by the Diaphragm Method will be explained with reference to FIG. 1.

Figure 1:
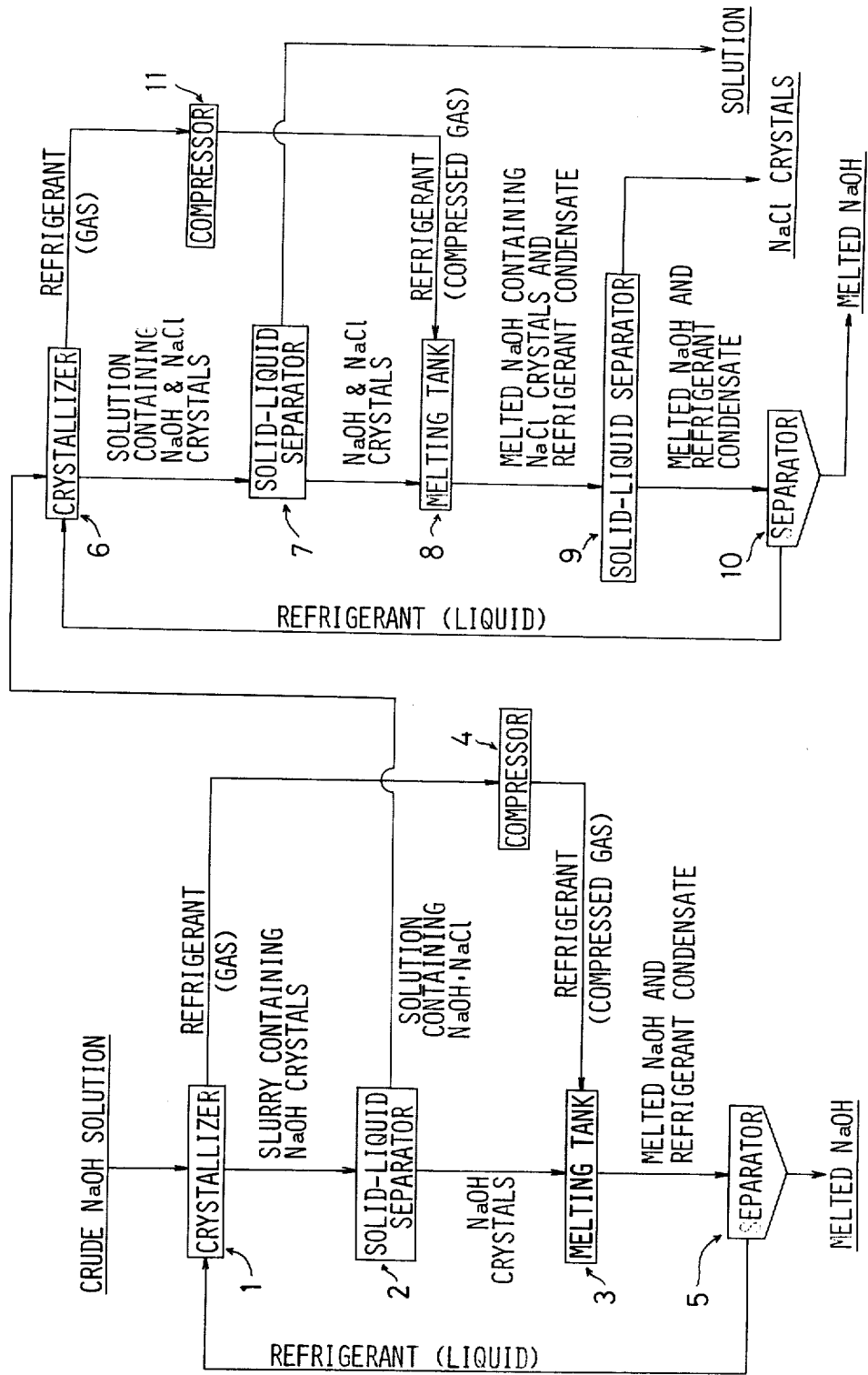
FIG. 1 is a flow sheet illustrating one preferred embodiment of the operation for practicing the method of this invention.

Referring to FIG. 1, the electrolyzate produced by the Diaphragm Method contains 12 to 20 percent of sodium hydroxide and 12 to 14 percent of sodium chloride. Sodium chloride crystals occur in the electrolyzate when the electrolyzate is concentrated and cooled. On separation of the crystals, the electrolyzate converts itself into a crude aqueous solution of caustic alkali which contains about 50 percent of sodium hydroxide and 1 to 2 percent of sodium chloride.

A refrigerant which is chemically stable against the aqueous solution of caustic alkali is brought into direct contact with said solution within a crystallizer. The refrigerant is dispersed and vaporized in the aqueous solution of caustic alkali, with the result that the heat of vaporization causes sodium hydroxide to be crystallized out of the solution. If, in this case, the sodium hydroxide concentration in the aqueous solution of caustic alkali is 40 to 50 percent, then 3.5-hydrate of sodium hydroxide will be educed by having the solution cooled to a temperature below 15°C. Sodium hydroxide crystals of high purity can be obtained by separating the educed sodium hydroxide crystals by means of any known solid-liquid separator 2. This separation is effected as with a centrifugal separator, for example, by cleaning the crystals of impurities adhering to their surface. The cleaned crystals are separated in the form of a slurry. For some uses, the crystals in the slurry may be recovered in a solid form. For other uses, the slurry containing the sodium hydroxide crystals may be placed in a melting tank 3 and brought into direct contact with the refrigerant which has formerly been vaporized in a crystallizer 1 and subsequently compressed in a compressor 4 so that the sodium hydroxide crystals in the slurry will be liquefied by virtue of the heat of liquefaction of the refrigerant. Then, the mixture is transferred to a separator 5, wherein the melted sodium hydroxide is separated from the refrigerant condensate by virtue of difference in density, so that sodium hydroxide will be recovered in a melted state. It is, of course, possible to have these sodium hydroxide crystals heated indirectly in a heat exchanger, so that sodium hydroxide will be recovered in a melted state.

The refrigerant to be used for the purpose of this invention is required to be a substance which does not react with the aqueous solution of caustic alkali, has a density widely different from that of said solution and enjoys chemical stability. Examples of the refrigerant which satisfies such requirements include Freon refrigerants and refrigerants of butane family. For example, Freon refrigerant R-12 has a density of 1.36 g/cm$^2$ and normal butane a density of 0.6 g/cm$^2$ respectively at 10°C. (The density of 40 percent sodium hydroxide solution is 1.45 g/cm$^2$.) When temperature, heat of crystallization, difference in density and other crystallization conditions for 3.5-hydrate of sodium hydroxide are taken into consideration, use of the liquefied gas of a member of butane family may prove to be more advantageous. However, this liquefied gas is inflammable and explosive and, therefore, should be handled with care.

Because the present invention adopts the direct cooling method, the interface between the dispersed refrigerant and the aqueous solution functions as the surface of heat transfer. Thus, continuous formation of crystals in the system does not interfere, in any way, with the transfer of heat between the two phases, making possible the continuous operation. In addition, this method has a far greater area of heat transfer and much higher cooling efficiency than the indirect cooling method.

The mother liquid which remains after the sodium hydroxide crystals have been separated in said solid-liquid separator 2 still contains sodium chloride and uncrystallized sodium hydroxide. This mother liquid is let to another crystallizer 6, wherein it is brought into direct contact with the refrigerant and brought to a temperature below 14°C to induce precipitation of crystals. In this case, since the sodium chloride concentration in the mother liquid is close to the degree of saturation, crystals of sodium chloride are precipitated together with those of sodium hydroxide. Thus, the precipitate which occurs in the mother liquid is a mixture of sodium chloride and sodium hydroxide. For the separation of sodium hydroxide from this mixture, therefore, it becomes necessary to adopt a process which is described herein below. The mixture of crystals is forwarded to a solid-liquid separator 7 for separation into the solid and liquid phases. The mixture is then placed in a melting tank 8, wherein the refrigerant which has formerly been liquefied in the crystallizer tank 6 and subsequently compressed in a compressor 11 is brought into direct contact with said mixture of crystals. Since the crystals of sodium chloride dissolve at an extremely low velocity, the crystals of sodium hydroxide alone are rapidly converted into a melted state and the greater part of sodium chloride remains in the form of undissolved crystals and the greater part of the refrigerant is condensed into a liquid form. The mixture which now consists of melted sodium hydroxide, refrigerant condensate and sodium chloride cyrstals is treated by a solid-liquid separator 9 such as, for example, a centrifugal separator or a decanter, so as to have sodium chloride crystals separated from melted sodium hydroxide and refrigerant condensate.

The melted sodium hydroxide and the refrigerant condensate are separated from each other by virtue of the difference in density in a separator 10. From the separator 10 is obtained a highly purified, melted sodium hydroxide. The refrigerant condensate is sent back to the crystallizer 6.

Figure 2:
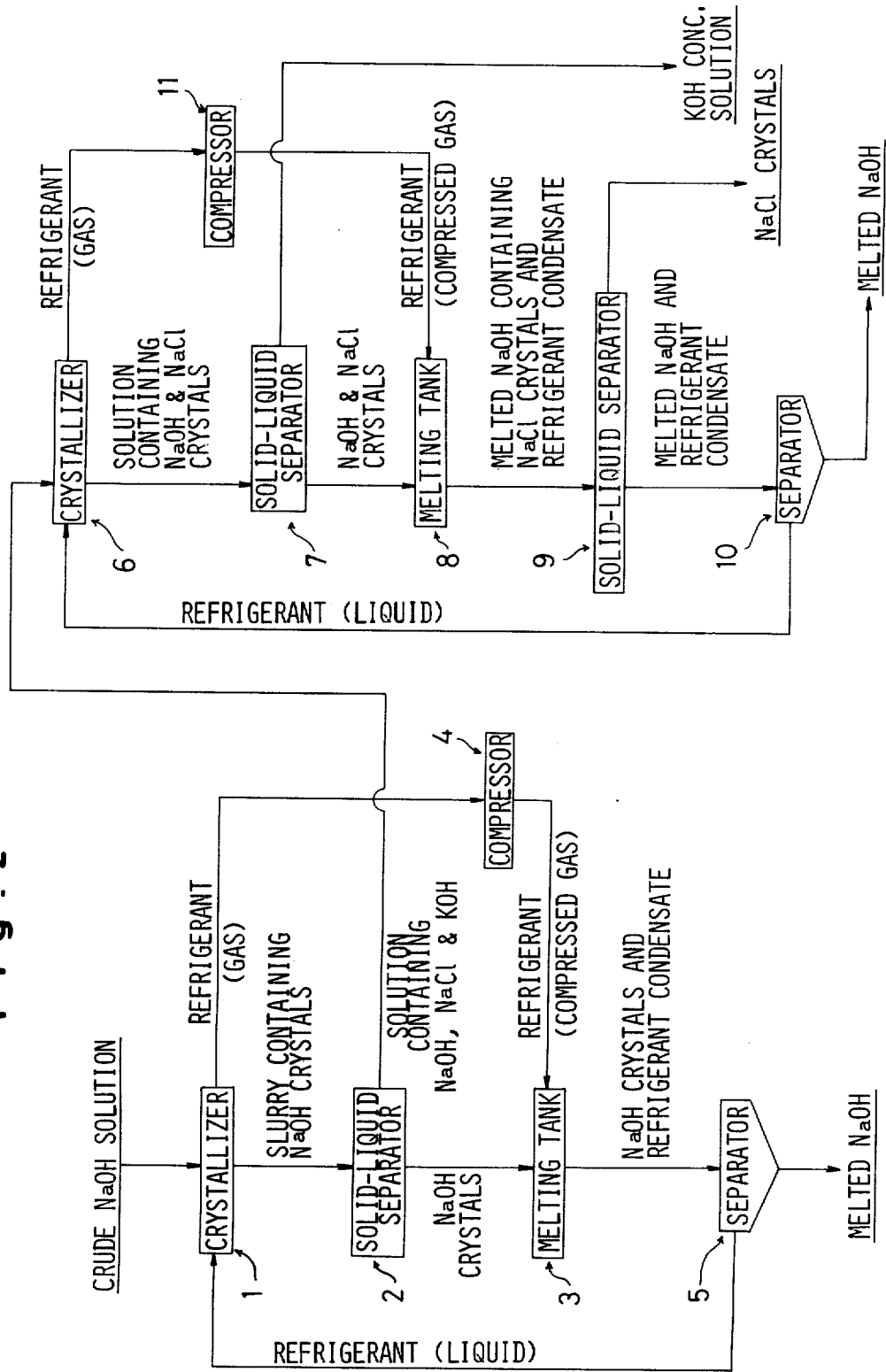
FIG. 2 is a flow sheet illustrating another preferred embodiment of the operation for practicing the method of this invention.

The method for obtaining highly purified sodium hydroxide from the electrolyzate to be derived through the diaphragm electrolysis of sea water concentrate such as the concentrated sea water remaining after separation of fresh water from sea water and simultaneously causing potassium existing from the beginning in the sea water to be separated in the form of a concentrated liquid will now be explained with reference to FIG. 2.

The electrolyzate of the concentrated sea water resulting from separation of fresh water is concentrated and cooled to have the greater part of sodium chloride removed therefrom. The crude aqueous solution of caustic alkali which is consequently formed still contains a small amount of sodium chloride besides potassium. This aqueous solution is brought into direct contact with the refrigerant, in the same way as in the procedure of FIG. 1, so as to induce crystallization of sodium hydroxide.

The solution which now contains the precipitated sodium hydroxide crystals is transferred to a solid-liquid separator 2, wherein the solution is separated into sodium hydroxide crystals and the mother liquid. The sodium hydroxide crystals thus separated contain absolutely no impurities and can be put to use in their original crystalline form or they may be converted to a melted state to suit the purpose for which it is used. The mother liquid is placed in a crystallizer 6 and brought into direct contact with the refrigerant so as to be cooled. Although the temperature to which it is cooled varies to some extent with the composition of the liquid, it is generally below 10°C.

In the crystallizer 6, since the sodium chloride concentration in the mother liquid is close to the saturated concentration, not only crystals of sodium hydroxide but those of sodium chloride are precipitated.

The slurry consisting of the crystals of both salts is placed in a solid-liquid separator 7, and then passed to melting tank 8 into which the refrigerant which has formerly been vaporized in a crystallizer 1 and subsequently compressed in a compressor 11 is introduced. Consequently, sodium hydroxide crystals alone are quickly melted and, at the same time, the greater part of the gaseous refrigerant is condensed.

The mixture which now consists of melted sodium hydroxide and refrigerant condensate in addition to unaltered sodium chloride crystals is delivered to a solid-liquid separator 9, wherein sodium chloride crystals are separated to leave behind a mixture of melted sodium hydroxide and refrigerant condensate. This mixture is treated in a separator tank 10, wherein melted sodium hydroxide and refrigerant condensate are separated from each other by virtue of difference in density. The melted sodium hydroxide is recovered as a final product and the liquefied refrigerant is cycled back into the crystallizer 6.

The mother liquid which occurs in consequence of the separation in the solid-liquid separator 7 contains sodium hydroxide, sodium chloride and potassium hydroxide. Upon concentration, this mother liquid converts itself into a liquid containing potassium at a high concentration.

As is clear from the detailed description given above, the present invention can produce highly purified sodium hydroxide from the electrolyzate originating in the electrolysis by the Diaphragm Method by causing the electrolyzate to be brought into direct contact with a refrigerant which is stable against said electrolyzate. And, it can produce a liquid containing potassium at a high concentration in addition to highly purified sodium hydroxide by using as the starting material the electrolyzate derived from potassium-containing sea water. This liquid which contains potassium hydroxide at a high concentration can be mixed with phosphate ore and used as a fertilizer, for example.

The direct cooling method by which a refrigernat is brought into direct contact with a raw material as described above has been utilized for conversion of sea water to fresh water. In the present invention, this method has been applied for the first time to recovery of highly purified sodium hydroxide from aqueous solution of caustic alkali. According to the method of this invention, since the interface between the solution and the refrigerant dispersed in the solution constitutes itself as the surface of heat transfer, the operation can be performed continuously without fear of scale deposition and the area of heat transfer is very large. The performance of the equipment, therefore, is conspicuously improved as compared with the equipment employed for the indirect cooling method. Further, the refrigerant which has been vaporized in the crystallizer is compressed in the compressor and the compressed refrigerant gas is brought into direct contact with the hydrated crystals which have been separated and cleaned so that the refrigerant is condensed to its liquid state and, at the same time, the hydrate is melted. Thus, the direct cooling method has an additional advantage of being utilized for melting the hydrated crystals. This invention enables the hydrate to be quickly melted by virtue of the heat of liquefaction of the refrigerant. Similarly in the case of the liquid containing potassium at a high concentration and involving precipitation of chloride crystals simultaneously with the precipitation of hydrate crystals, the hydrate crystals alone are quickly melted so that the undissolved chloride crystals can be mechanically separated from the liquid. Accordingly, this invention enables highly purified sodium hydroxide having little sodium chloride content to be derived even from a solution which contains potassium hydroxide and sodium chloride at high concentrations.

DESCRIPTION OF THE PREFERRED EMBODIMENTS

Figure 3:
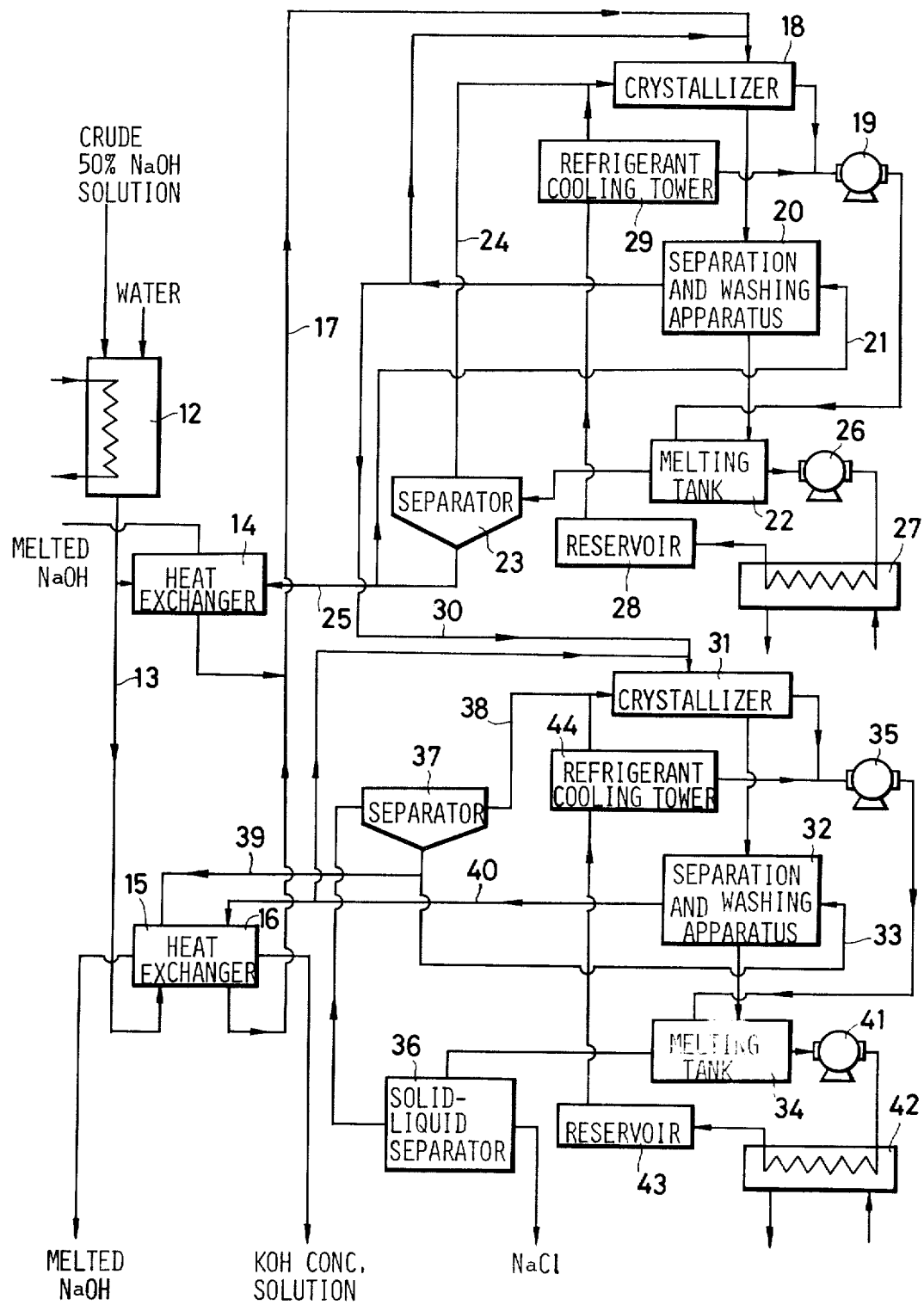
FIG. 3 is a schematic representation of one preferred embodiment of the equipment for practicing the method of this invention.

A preferred embodiment of this invention will be described herein below with reference to the flow sheet of FIG. 3. It should be understood that the present invention is not in any way limited to this example.

EXAMPLE

Sea water remaining after separation of fresh water was electrolyzed. The resultant electrolyzate was concentrated and cooled to have the greater part of sodium chloride removed. The crude aqueous solution of caustic alkali thus obtained was used as the starting material. This aqueous solution contained solids at a concentration of about 50 percent. In a dilution tank 12, the aqueous solution was diluted with water to a solid concentration of about 40 percent (about 35 percent of sodium hydroxide, about 2.8 percent of potassium hydroxide and about 1.2 percent of sodium chloride). The dilution caused the aqueous solution to rise to about 40°C. This aqueous solution was forwarded through a path 13 into heat exchangers 14, 15 and 16, wherein the solution cooled itself by transferring heat to the highly purified sodium hydroxide and the potassium hydroxide concentrate discharged at high temperatures out of the system. The cooled aqueous solution was then transferred via a path 17 to a crystallizer 18. In the crystallizer 18, the solution was brought into direct contact with a liquefied refrigerant (Freon R-12). Upon contact, the refrigerant vaporized itself by robbing the solution of heat. The gaseous refrigerant was returned to a compressor 19 so as to be compressed. The solution was cooled to about 10°C by the heat of vaporization of the refrigerant, with the result that 3.5-hydrate of sodium hydroxide was precipitated in the form of crystals. Now the solution contained the educed crystals and assumed the state of slurry. The slurry was sent to a separation and cleaning apparatus 20, wherein it was separated into crystals and mother liquid. The crystals were washed with the aqueous solution of sodium hydroxide being delivered via a path 21 and the washed crystals were introduced into a melting tank 22. At the same time, the compressed refrigerant gas from the compressor 19 was introduced into the melting tank 22 and brought into direct contact with the crystals, so that the crystals were melted by virtue of the heat of liquefaction of the refrigerant gas and at the same time the greater part of the compressed refrigerant gas was condensed. The melted sodium hydroxide and the refrigerant condensate were sent to a separator 23, wherein they were separated from each other by virtue of the difference in density (at 10°C, the density of 40 wt% sodium hydroxide solution being 1.45 g/cm³ and that of Freon refrigerant R-12 1.36 g/cm³ respectively). The refrigerant was cycled via a path 24 to the crystallizer 18, so as to repeat the next cycle of freezing process comprising the steps of gasification-compression-condensation, as described above. Part of the melted sodium hydroxide was forwarded via the path 21 to the separation and cleaning apparatus 20 to serve as the washing liquid, while the remaining part thereof was passed through a path 25 and the heat exchanger 14 to produce sodium hydroxide. The sodium hydroxide solution obtained at this point was found to contain 38 percent of sodium hydroxide, 0.15 percent of potassium hydroxide and 0.08 percent of sodium chloride. The refrigerant gas which had escaped liquefaction in the melting tank 22 was once again compressed by a compressor 26 and condensed to a liquid form by means of cooling water in a condenser 27. The refrigerant condensate was then stored in a refrigerant reservoir 28, deprived of its temperature by virtue of the heat of vaporization of itself within a refrigerant cooling tower 29 and cycled into the crystallizer 18.

The mother liquid which had occurred in consequence of the separation in the separation and cleaning apparatus 20 contained potassium hydroxide and sodium chloride in addition to uncrystallized sodium hydroxide. It was found to contain 31 percent of sodium hydroxide, 5.5 percent of potassium hydroxide and 2.3 percent of sodium chloride. This mother liquid was forwarded via a path 30 into a crystallizer 31, wherein it was brought into direct contact with the refrigerant as in the case of the crystallizer 18, so that the liquid was cooled to about −5°C by virtue of the heat of vaporization of the refrigerant to induce precipitation of sodium hydroxide crystals. In this case, precipitation of sodium chloride crystals occurred simultaneously with that of sodium hydroxide crystals. The solution containing the two kinds of crystals assumed a state of slurry and, in a separation and cleaning apparatus 32 (centrifugal dehydrater), separated into a mixture of crystals and a mother liquid. The crystals were washed with the melted sodium hydroxide being supplied via a path 33 and the washed crystals were introduced into a melting tank 34. In the meantime, the refrigerant which had been vaporized in the crystallizer 31 was compressed by a compressor 35, then introduced into the melting tank 34 and brought into direct contact therein with the mixture of crystals. Upon contact with the refrigerant, sodium hydroxide crystals were selectively melted at a rapid rate of speed and converted to a melted state. Sodium chloride crystals in the mixture were not dissolved. Since the solution velocity at which the crystals were converted to the melted state was conspicuously low, the greater part of the crystals remained in an undissolved form. At the same time, the greater part of the refrigerant gas was condensed to its liquid state. A slurry which now consisted of refrigerant condensate, melted sodium hydroxide and undissolved crystals was placed in a solid-liquid separator (centrifugal decanter) 36, wherein it was separated into a slurry containing sodium chloride crystals and a mixed solution containing both melted sodium hydroxide and refrigerant condensate. The separated mixture of refrigerant condensate and melted sodium hydroxide was separated from each other in a separator 37 by virtue of the difference in density. The melted portion obtained by this separation was found to contain 37 percent of sodium hydroxide, 1.5 percent of potassium hydroxide and 0.2 percent of sodium chloride. The refrigerant condensate, on the other hand, was cycled via a path 38 to the crystallizer 31. Part of the melted sodium hydroxide was forwarded via the path 33 to the separation and cleaning apparatus 32, wherein it was used as the washing liquid. The remaining portion of the melted sodium hydroxide was discharged via a path 39 and the heat exchanger 15 to afford highly purified melted sodium hydroxide. The slurry of sodium chloride separated in the solid liquid-separator 36 was ascertained to be usable as the raw material for electrolysis. The mother liquid which had occurred after separation of crystals in the separation and cleaning apparatus 32 contained 18.5 percent of sodium hydroxide and 18.5 percent of potassium hydroxide and had a chlorine ion concentration of 0.4 percent. It was forwarded via a path 40 and the heat exchanger 16 and discharged to produce potassium concentrate. The refrigerant gas which had escaped condensation within the melting tank 34 was compressed in a compressor 41 and condensed to its liquid state by means of cooling water within a condenser 42. The refrigerant condensate thus formed was stored in a refrigerant reservoir 43, from which it was supplied via a cooling tower 44 into the crystallizer 31.

We claim:

1. A method for the manufacture of purified sodium hydroxide, comprising the steps of bringing crude sodium chloride-containing aqueous solution of caustic alkali into direct contact with a refrigerant stable against said aqueous solution, thereby cooling said aqueous solution to a temperature below 15°C. by virtue of the heat of vaporization of said refrigerant, and consequently inducing precipitation of 3.5-hydrated sodium hydroxide crystals in said aqueous solution, and thereafter separating said crystals from the resultant solution by solid-liquid separation treatment.

2. A method according to claim 1, wherein the separated sodium hydroxide crystals are again brought into contact with the refrigerant so as to be melted by the heat of liquefaction of the refrigerant.

3. A method according to claim 1, wherein the refrigerant stable against the aqueous solution of caustic alkali is one member selected from the group consisting of Freon refrigerant R-12 and normal butane refrigerant.

4. A method for the manufacture of purified sodium hydroxide, comprising the steps of bringing crude sodium chloride-containing aqueous solution of caustic alkali into direct contact with a refrigerant stable against said aqueous solution, said aqueous solution of caustic alkali containing about 39.0 percent of sodium hydroxide and about 1.2 percent of sodium chloride, cooling said aqueous solution to a temperature below 15°C. by virtue of the heat of vaporization of said refrigerant, and consequently inducing precipitation of 3.5-hydrated sodium hydroxide crystals in said aqueous solution, and thereafter separating said crystals from the resultant solution by solid-liquid separation treatment.

5. A method for the manufacture of purified sodium hydroxide, comprising the steps of bringing a crude aqueous solution of caustic alkali containing both sodium chloride and potassium hydroxide into direct contact with a refrigerant stable against said aqueous solution for thereby cooling said aqueous solution by virtue of the heat of vaporization of said refrigerant and inducing precipitation of sodium hydroxide crystals, thereafter separating sodium hydroxide crystals by a solid-liquid separation treatment from the resultant solution containing the precipitated sodium hydroxide crystals, further bringing the aqueous solution remaining after separation of said sodium hydroxide crystals into direct contact with a refrigerant stable against said aqeuous solution for thereby cooling said aqueous solution by virtue of the heat of vaporization of said refrigerant and inducing precipitation of sodium chloride crystals and sodium hydroxide crystals and thereafter separating the resultant crystals-containing solution by a solid-liquid separating treatment into a mixture of sodium hydroxide and sodium chloride crystals and an aqueous solution containing potassium hydroxide.

6. A method according to claim 5, wherein the separated sodium hydroxide crystals are again brought into contact with the refrigerant so as to be melted by the heat of liquefaction of the refrigerant.

7. A method according to claim 5, wherein sodium chloride crystals and sodium hydroxide crystals are again brought into direct contact with the refrigerant so as to have sodium hydroxide crystals alone melted by the heat of liquefaction of the refrigerant and sodium chloride crystals are separated from said melted sodium hydroxide.

8. A method according to claim 5, wherein the refrigerant stable against the aqueous solution of caustic alkali is one member selected from the group consisting of Freon refrigerant R-12 and normal butane refrigerant.

9. A method according to claim 5, wherein the aqueous solution of caustic alkali contains about 36 percent of sodium hydroxide, about 2.8 percent of potassium hydroxide and about 1.2 percent of sodium chloride, the temperature to which the solution is cooled is not more than 15°C, and the sodium hydroxide crystals to be educed are those of 3.5-hydrate of sodium hydroxide.

* * * * *